United States Patent
Scinto et al.

(10) Patent No.: US 11,766,785 B2
(45) Date of Patent: Sep. 26, 2023

(54) AUTOMATED TESTING SYSTEM

(71) Applicant: Noiseout, Inc., East Hampton, NY (US)

(72) Inventors: Jennifer Scinto, East Hampton, NY (US); Bonnie S. Schnitta, East Hampton, NY (US)

(73) Assignee: Noiseout, Inc., East Hampton, NY (US)

( * ) Notice: Subject to any disclaimer, the term of this patent is extended or adjusted under 35 U.S.C. 154(b) by 297 days.

(21) Appl. No.: 16/457,998

(22) Filed: Jun. 29, 2019

(65) Prior Publication Data
US 2020/0001470 A1 Jan. 2, 2020

Related U.S. Application Data

(60) Provisional application No. 62/692,508, filed on Jun. 29, 2018.

(51) Int. Cl.
  *B25J 13/00* (2006.01)
  *B25J 13/08* (2006.01)

(52) U.S. Cl.
  CPC ........... *B25J 13/006* (2013.01); *B25J 13/089* (2013.01)

(58) Field of Classification Search
  CPC ......... B25J 13/006; B25J 13/089; E04B 1/82; G01N 2291/0232; G01N 29/045
  USPC ................................................ 700/245–264
  See application file for complete search history.

(56) References Cited

U.S. PATENT DOCUMENTS

| | | | | |
|---|---|---|---|---|
| 4,037,828 A * | 7/1977 | Terada | ................. | F27D 3/1527 266/271 |
| 5,589,635 A * | 12/1996 | Baudrillard | .......... | G01N 29/045 73/602 |
| 8,751,045 B2 * | 6/2014 | Wang | ................ | H01L 21/67733 702/56 |
| 9,487,356 B1 * | 11/2016 | Aggarwal | .............. | G05B 15/02 |
| 9,804,577 B1 * | 10/2017 | Troy | ................... | G01N 29/4472 |
| 2002/0025751 A1 * | 2/2002 | Chen | ....................... | B32B 27/12 442/320 |
| 2003/0076015 A1 * | 4/2003 | Ehrenreich | ............ | A61B 50/13 312/209 |
| 2005/0216126 A1 * | 9/2005 | Koselka | ................. | B25J 19/023 700/259 |
| 2006/0195226 A1 * | 8/2006 | Matsukawa | .............. | B25J 9/162 700/245 |
| 2007/0192910 A1 * | 8/2007 | Vu | ............................ | B25J 19/06 901/17 |
| 2009/0299525 A1 * | 12/2009 | Takahashi | ............. | B60B 19/003 901/1 |
| 2010/0182356 A1 * | 7/2010 | Hoerl, Jr. | ................. | B05B 12/14 347/3 |

(Continued)

*Primary Examiner* — Jonathan L Sample
(74) *Attorney, Agent, or Firm* — Hughes Hubbard & Reed LLP

(57) ABSTRACT

A robotic platform for a tapping machine includes a sensor, a controller, a wireless interface directly or indirectly connected to the controller, a frame for receiving a tapping machine and a motor attached to the frame for moving the frame with the tapping machine received thereon. The frame is configured to exhibit dimensions and strength to hold a tapping machine, or other machine with a proportional-derivative control, where upon commands provided to it by the controller, the motor moves the frame and tapping machine, or other machine, through the four positions required by the ASTM test methods, under wireless control.

12 Claims, 5 Drawing Sheets

(56) References Cited

U.S. PATENT DOCUMENTS

| | | | |
|---|---|---|---|
| 2010/0234993 A1* | 9/2010 | Seelinger | G05D 1/0251 700/254 |
| 2011/0066303 A1* | 3/2011 | Hara | G01C 21/28 701/1 |
| 2011/0248140 A1* | 10/2011 | Sauret | F16M 11/425 248/346.03 |
| 2012/0180424 A1* | 7/2012 | Hinshaw | E04B 1/26 700/95 |
| 2013/0231779 A1* | 9/2013 | Purkayastha | G05D 1/0088 700/258 |
| 2014/0350725 A1* | 11/2014 | LaFary | B25J 9/1676 901/50 |
| 2015/0176270 A1* | 6/2015 | Cheung | E04F 15/225 524/8 |
| 2015/0190927 A1* | 7/2015 | Sutherland | H04L 65/60 901/1 |
| 2015/0257355 A1* | 9/2015 | Pinsky | A61B 8/0866 119/14.01 |
| 2016/0221512 A1* | 8/2016 | Goodrich | F16M 1/00 |
| 2016/0252422 A1* | 9/2016 | Howitt | G01M 3/2807 73/40.5 A |
| 2016/0259339 A1* | 9/2016 | High | H04L 67/12 |
| 2016/0327383 A1* | 11/2016 | Becker | G01B 11/005 |
| 2017/0038770 A1* | 2/2017 | Wurman | C07C 255/43 |
| 2017/0088360 A1* | 3/2017 | Brazeau | B25J 9/1664 |
| 2017/0182696 A1* | 6/2017 | Cantlin | B29B 9/06 |
| 2017/0223947 A1* | 8/2017 | Gall | A01B 79/005 |
| 2017/0357270 A1* | 12/2017 | Russell | G06V 20/58 |
| 2017/0361462 A1* | 12/2017 | Chelian | B25J 13/006 |
| 2018/0333987 A1* | 11/2018 | Ratcliffe | B66F 11/044 |
| 2019/0329407 A1* | 10/2019 | Qi | G05D 1/0274 |

\* cited by examiner

AUTOMATED TESTING SYSTEM

CROSS-REFERENCE TO RELATED APPLICATIONS

This application derives the benefit of the filing date of U.S. Provisional Patent Application No. 62/692,508, filed Jun. 29, 2018, the content of which provisional application is incorporated herein by reference.

BACKGROUND OF THE INVENTION

The invention relates broadly to automatic testing systems and, more particularly, to a robotic platform for automated testing systems for Impact Insulation Class (IIC), Apparent Impact Insulation Class (AIIC), Field Impact Insulation Class (FIIC) and other similar tests and determination.

Most municipal building codes include minimum required ratings for the Impact Insulation Class (IIC) of a floor-ceiling configuration (NYC building code 1207.3). This rating may be based on ASTM lab testing, ASTM FIIC (field impact insulation class) testing of the floor-ceiling assembly or other tests to determine if a partition meets building code, to provide data to an engineer for a certain FIIC, or to evaluate the efficacy of the partition to bring the transmission of impact noise from footfall in the above dwelling to what is perceived as an acceptable level. The AIIC or FIIC involves the use of a tapping machine (see FIG. 1) to create impact noise in the source room to be measured on the other side of the partition, also known as the receiving room.

The tapping machine, during the testing, is moved to its various positions as required by the ASTM test (See FIG. 2). The positions require communication of the location of the impact or impact machine to the person below, or one person running up and down to reposition and then take the readings. All methods take away from valuable work and time for those involved in the test. Additionally, the moving of the machine often does vary from the required location thus reducing the precision of location.

The procedure for FIIC testing is detailed in ASTM Test E1007, "STANDARD TEST METHOD OF FIELD MEASUREMENT OF TAPPING MACHINE IMPACT SOUND TRANSMISSION THROUGH FLOOR-CEILING ASSEMBLIES AND ASSOCIATED SUPPORT STRUCTURES" (ASTM E1007, West Conshokocken, Pa., 2004), and is presented now as an example to demonstrate the overall improvements provided by the innovative robotic system. The AIIC or the FIIC is the standardized test used by all acousticians to collect the data required to determine the single number AIIC or FIIC rating of a floor-ceiling assembly. The IIC rating of a floor is directly related to the ability of the floor to attenuate impact sounds from the tapping machine, and by extension, other impact sounds such as footfall. In accordance with the test method, sound pressure levels are recorded in the receiving room for the sixteen one-third octave bands between 100 Hz and 3150 Hz. This frequency spectrum is fitted with an IIC curve defined by a contour given in ASTM E989, "Standard Classification for Determination of Impact Insulation Class (IIC)" and a single number IIC or FIIC rating is given corresponding to the best fitting IIC curve (ASTM International; STANDARD CLASSIFICATION FOR DETERMINATION OF IMPACT INSULATION CLASS (IIC); ASTM E989, West Conshokocken, Pa., 2006).

Many argue that this method of calculation for the IIC rating is insufficient, as the lower frequency responses of the floor from footfall and the higher frequency responses from squeaking of materials when being walked on are not adequately represented (John J. LoVerde and Wayland D. Dong. A DUAL-RATING METHOD FOR EVALUATING IMPACT NOISE ISOLATION OF FLOOR-CEILING ASSEMBLIES. Journal of the Acoustical Society of America, 141:428-440, 2017). While there is an ongoing debate as to the method of the rating calculations, the use of the tapping machine is widely recognized as a valuable and consistent diagnostic tool and used in the calculation of the lower and higher frequency IIC values.

ASTM prescribes test methods for both the laboratory measurement of IIC and the field-tested measurement of FIIC and AIIC. The IIC rating of an assembly tested in the laboratory is expected to be higher than the field-tested FIIC or AIIC rating, as flanking paths and variation in construction methods can result in differing capacity of an assembly to attenuate impact noise. The AIIC and FIIC rating of an assembly within a building is generally acceptable to be within 5 points of the IIC required by code. The testing protocols required in the field and in the laboratory are essentially identical, requiring that measurements be taken with the tapping machine in the same four positions (ASTM E492). STANDARD TEST METHOD FOR LABORATORY MEASUREMENT OF IMPACT SOUND TRANSMISSION THROUGH FLOOR-CEILING ASSEMBLIES USING THE TAPPING MACHINE (ASTM International, West Conshokocken, Pa., 2004). The positions become critical in flooring assemblies that consist of wooden joists. As a result of the direction and spacing of the joists, the sound level measurements in the receiving room may differ depending on the location and orientation of the tapping machine in the source room. The four positions of the tapping test ensure that the floor is excited parallel to, perpendicular to and diagonal to the direction of the joists, as depicted in FIG. 3. If there is a conduit in the poured concrete floor, the positioning of the tapping machine is also very critical.

The tapping machine was first adopted after the ISO R140 standard for evaluation of floor-ceiling assemblies was established in 1960. At that point in time, traditional methods of floor excitation such as walking, running and jumping were abandoned in favor of a standardized technology for excitation of floor-ceiling assemblies. The tapping machine, as outlined in the standard, consists of 5 hammers, each dropped at a frequency of 2 Hz, resulting in 10 Hz of tapping. The ISO standard specifies dimensions and weights of the hammers as well as the radius of curvature of their tapping surface and the height from which they are dropped ((Bruel and Kjaer. Technical review to advance techniques in acoustical, electrical and mechanical measurement, vol. 2. Technical report, Naerum, Denmark, 1967).

The tapping machine is now a widely adopted technology, used by all acousticians in ASTM testing, although walking, running and jumping are still used to evaluate, the response of the floor-ceiling to specific footfall patterns not captured by the tapping test. Additional technologies also exist to explore specific impact behaviors similar to human impact patterns in a more standardized way.

Very few changes have been made to the tapping machine since its debut, as the specifications outlined in the ISO 8140 standard have remained the same, allowing minimal room for innovation on the part of designers and engineers. Some recent improvements to the design of the tapping machine include a remote control to allow the operator to turn the machine on and off from the room below. This allows the acoustician to minimize the amount of disturbance imposed on the tenants during the testing process, but does not fundamentally change the procedure or provide additional automation or precision value. The problem remains as to the movement and accurate positioning of the tapping machine by one person.

As is known, the use of a tapping machine in four specific configurations is required in the determination of the AIIC, or FIIC rating of a floor-ceiling assembly as prescribed in American Society for Testing and Materials (ASTM) Test Method E1007, as well as in the laboratory IIC measurements prescribed in ASTM E492. When performed with presently available equipment, the procedure requires either two people to be present, one taking measurements in the room below the tapping machine, while the other person moves the tapping machine to four required positions in the room above, or, one person who must return to the machine on the floor above after taking each measurement below.

SUMMARY OF THE INVENTION

The automated testing systems for IIC, AIIC, FIIC and other similar tests and determinations, of the present invention overcomes the shortcomings of the known arts.

In an embodiment, the inventive automated testing systems for IIC, AIIC, FIIC and other similar tests uses robotics components to be retrofitted to any existing machine. Doing so enables wireless control of the position of the machine from the floor below, allowing a single person to perform the test. That is, the innovative automated testing system enables the IIC, AIIC, FIIC testing and other similar test procedures to be carried out by a single person in a more efficient and accurate manner than could be carried out using conventional automated testing systems.

In an embodiment, the invention comprises a robotic platform for a tapping machine that includes at least one sensor, a controller, a wireless interface directly or indirectly connected to the controller, a frame for receiving a tapping machine and a motor attached to the frame for moving the frame with the tapping machine received thereon. The frame is configured to exhibit dimensions and strength to hold a tapping machine, or other machine with a proportional-derivative control, where upon commands provided to it by the controller, the motor moves the frame and tapping machine, or other machine, through the four positions required by the ASTM test methods, under wireless control.

The frame may include omni wheels and/or fiducial markers, positioned on the frame and wherein the at least one sensor identifies a frame position in space based on a sensor signal reflecting a position of the fiducial markers. The at least one sensor may comprise a webcam, camera or like image CCD pick-up device. The controller operates a software application that processes signals from the at least one sensor to determine positions the machine should move through the four positions required by the ASTM test methods. The platform preferably further comprises vibration isolators. Moreover, the robotic platform is not limited for use with tapping machines, but may be used with other machines that require precise movement to implement different operations at different locations.

In an embodiment, the invention comprises an automatic system for implementing ASTM test methods. The system includes a tapping machine and a robotic platform for the tapping machine. The robotic platform comprises one or more sensors, a controller, a wireless interface directly or indirectly connected to the controller, a frame for receiving a tapping machine and a motor attached to the frame for moving the frame with the tapping machine received thereon. The frame is configured to exhibit dimensions and strength to hold a tapping machine, or other machine with a proportional-derivative control, where upon commands provided to it by the controller, the motor moves the frame and tapping machine, or other machine, through the four positions required by the ASTM test methods, under wireless control.

The frame can include omni wheels and/or fiducial markers positioned on the frame and wherein the at least one sensor identifies a frame position in space based on a sensor signal reflecting a position of the fiducial markers. The at least one sensor comprises a webcam, camera or like image CCD pick-up device. The controller operates a software application that processes signals from the at least one sensor to determine positions the machine should move through the four positions required by the ASTM test methods. Preferably, the frame includes vibration isolators. Moreover, while the system is defined for use with a tapping machine, it is not limited thereto, but may be used with other machines that require precise movement.

BRIEF DESCRIPTION OF THE DRAWING FIGURES

The invention will be described in conjunction with the following drawings in which reference numerals designate like elements and wherein.

DETAILED DESCRIPTION OF THE INVENTION

The following is a detailed description of the example embodiments of the invention as depicted in the accompanying drawings. The example embodiments are presented in detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

In one embodiment, the invention includes a frame (referred to interchangeably herein as a platform, or for convenience frame/platform) upon which the tapping machine is arranged. The positioning of the frame or platform is controlled robotically, as explained in detail below, thereby controlling the positioning of the tapping machine. As the controller controls the positioning of the frame/platform and tapping machine thereon, it also concurrently controls operation of the tapping machine to implement the testing required by the various standards, automatically, in accordance with the inventive processing described below.

Figure 5A:
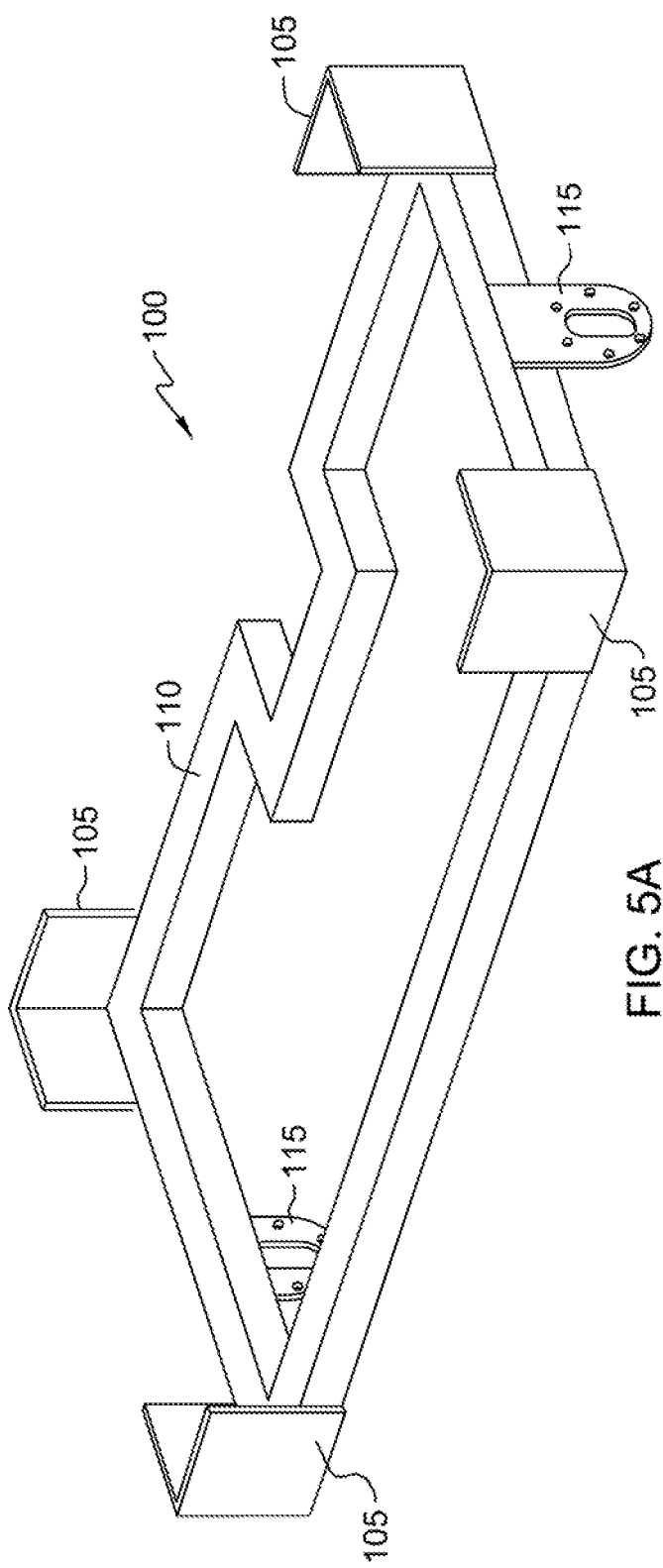
FIG. 5A depicts one embodiment of a frame or platform, configured according to the invention.
Figure 5B:
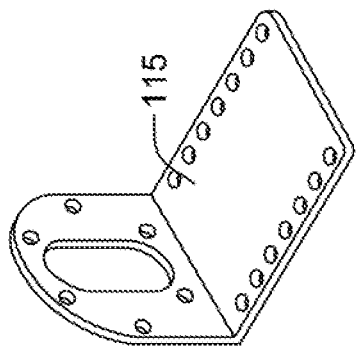
FIG. 5B depicts a mounting bracket that is used to fix a tapping machine to a frame/platform, such as the frame/platform depicted in FIG. 5A

FIG. 5A depicts one embodiment of a frame or platform 100, configured according to the invention. A conventional tapping machine may be positioned on the frame/platform (which follows the particular outer boundaries or shape of same, as shown), and maintained thereon by corner brackets 105 attached to the frame/platform structure 110 and by reliance on mounting brackets 115. FIG. 5B depicts a mounting bracket 115 in a top perspective view.

Dimensions

The dimensions of the frame or platform 100 are dictated by the length and width of the tapping machine or other alternate machine. This may require a fame/platform 100 that, follows the footprint or outline of the tapping machine that is to be used. Preferably, however the platform is adjustable on length and width. Whether frame/platform is a fixed shape or adjustable, the brackets 115 operate to keep the tapping machine from moving in order to optimize the precision of the tapping machine position, usually as called out by the standard. In the preferred embodiment shown in FIG. 5A, the platform 100 supports a tapping machine (i.e., the tapping machine sits on the platform/frame) and, as already explained, has side or corner supports to maintain the tapping machine in place on top of the platform (i.e., frame) 100.

The frame can be varied according to the machine placed on the frame, but incorporates the factors of camera location, wheel height, frame weight, frame corner stress evaluation, and tensile strength. In a preferred configuration, the caster wheel is steel and located at the center of the rear of the platform. This position is located between the microcontroller and the battery and aids in the balance, as the center of gravity of the tapping machine is often towards the rear of the platform.

Controller Selection

The tapping machine is controlled by a controller, embodying any conventional microprocessor. That is, the controller type is not a mandate, but must ensure that the timing of operations and loops within a program for controlling movement of the platform and for controlling operation of the tapping machine according to the platform stay consistent (National Instruments; What is a Real Time Operating System? November 2013). Additionally, the FPGA, or field programmable gate array, utilized in the National Instruments on my RIO platform, among others, allows for parallel processing so that tasks can be completed independently with no priority dependency (National Instruments; Introduction to FPGA Technology: Top 5 Benefits. April 2012). The controller used in the position control of the tapping machine system is comprised of proportional and derivative control. The reference signal of the system is the target encoder position of the motor. The encoders on the motor measure the current encoder position and the error is the difference between the target and current positions.

Motor Selection

The motors used to move the platform and tapping machine thereon must be operable to meet the requirements of the innovative system, but at a minimum two major criteria need to be met. First, the motors must be able to provide the torque required to move the weight of the tapping machine. Secondly, they must be able to provide encoder information for the position control of the frame either directly or indirectly.

Encoders

In order to control the position of the tapping machine platform, in the preferred configuration the motors have built-in encoders.

Modes of Operation

At this time there are two most common modes of operation of the machine. The first mode of operation is one in which a user chooses the position they want the tapping machine to move to. The front panel user interface of the program provides for this. The user is shown a picture of the position the tapping machine is moving to, and the buttons for the other positions are grayed out and disabled until the tapping machine has reached its target position. At that point the buttons are once again enabled, and the user can select the next position.

Note that the user interface shows a button to begin tapping. This is not functional in this version of the machine but illustrates a functionality that the user would have in a final version of this machine.

Figure 1:
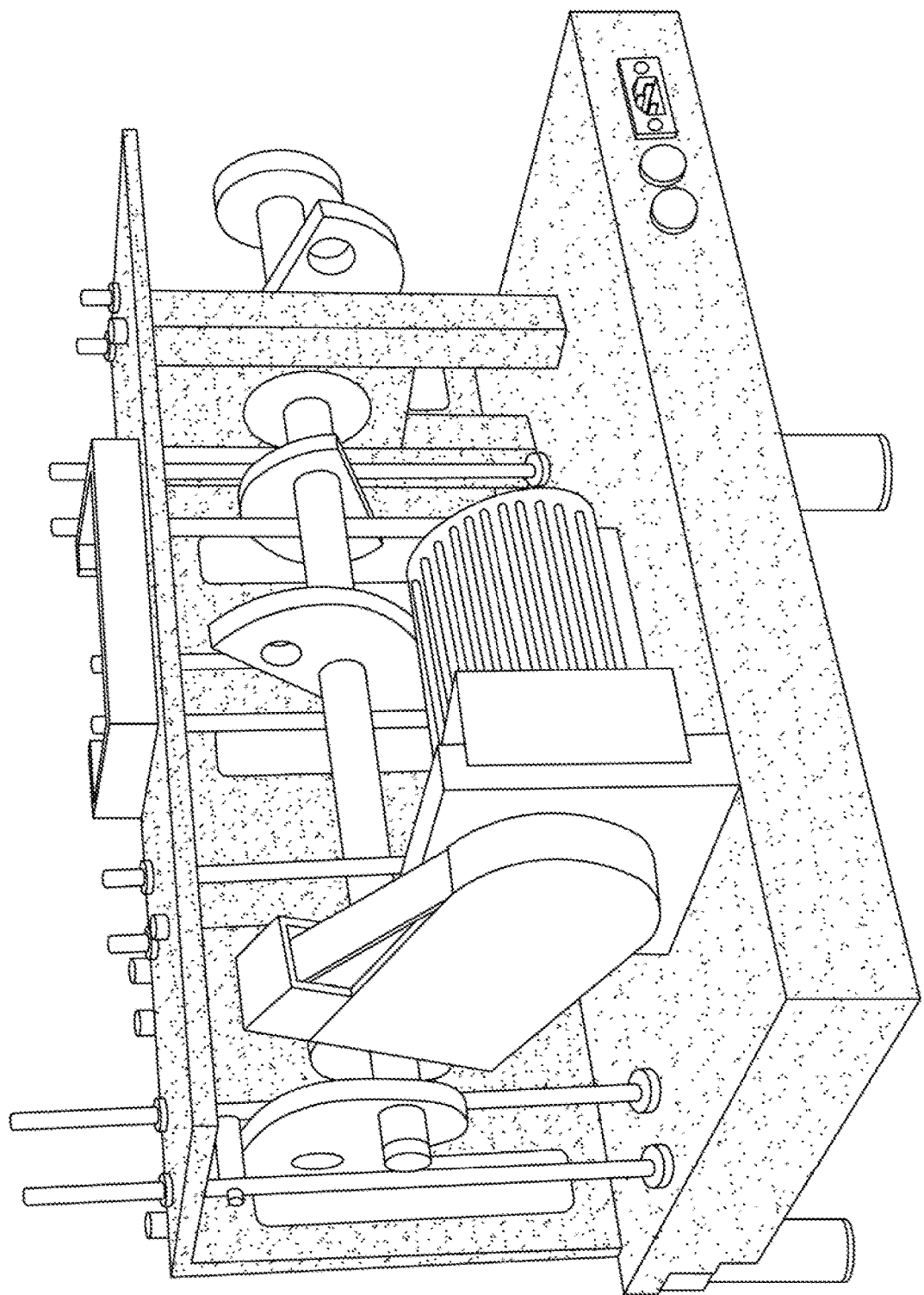
FIG. 1 depicts a prior art tapping machine.
Figure 2:
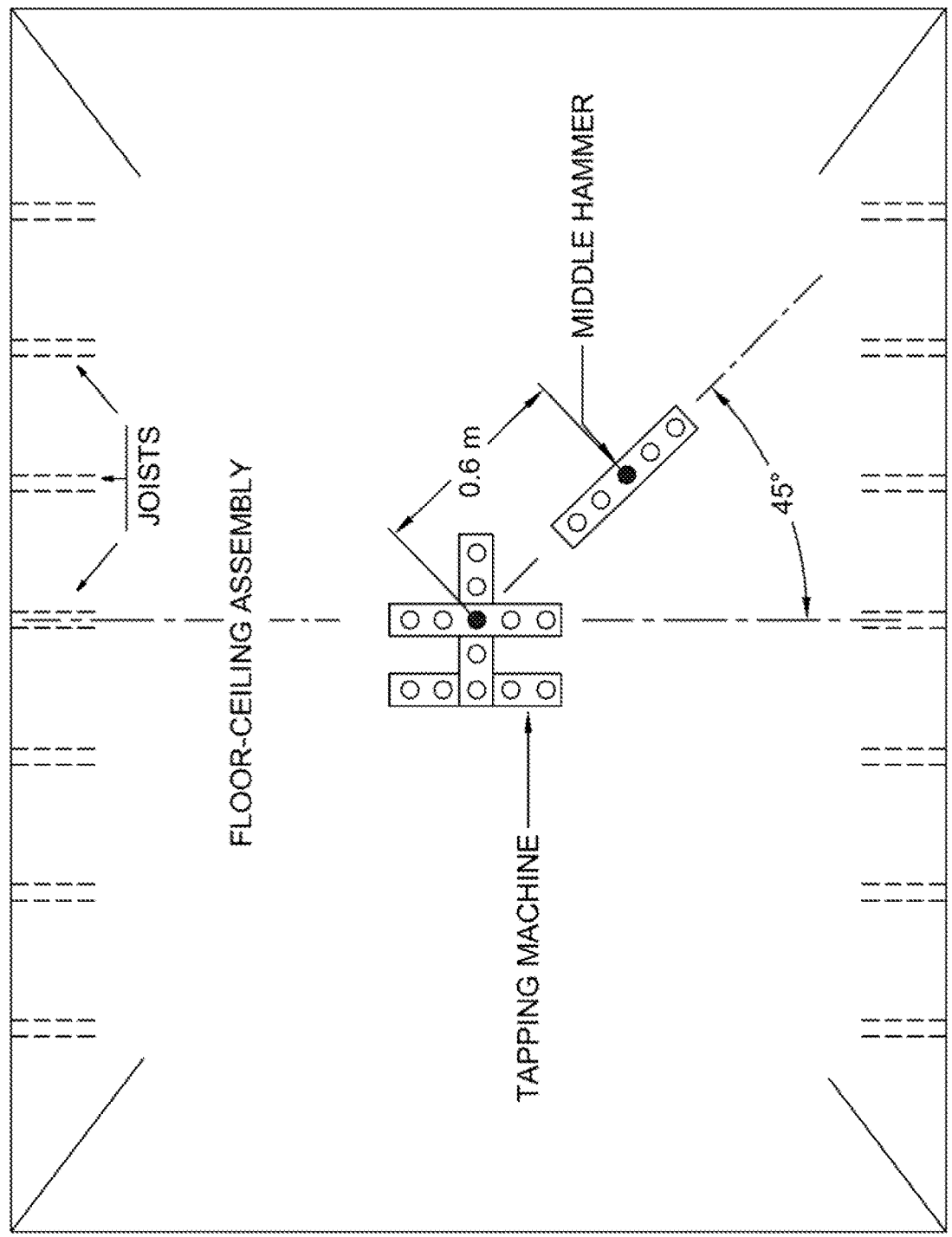
FIG. 2 depicts one position in a floor-ceiling assembly in which a known tapping machine is positioned for its conventional use.
Figure 3B:
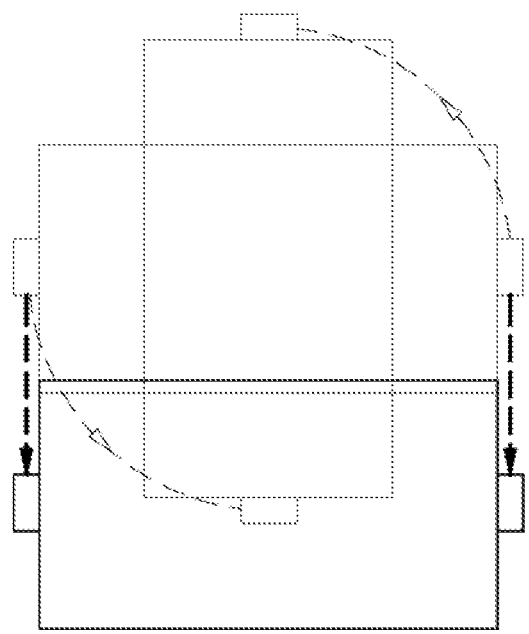
FIG. 3B depicts a tapping test excitation position parallel to the direction of the joists, as depicted in FIG. 3.
Figure 3A:
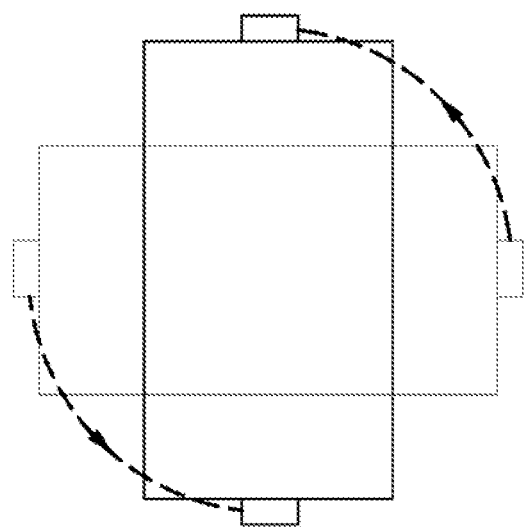
FIG. 3A depicts a tapping test excitation position perpendicular to the direction of the joists, as depicted in FIG. 3.
Figure 4B:
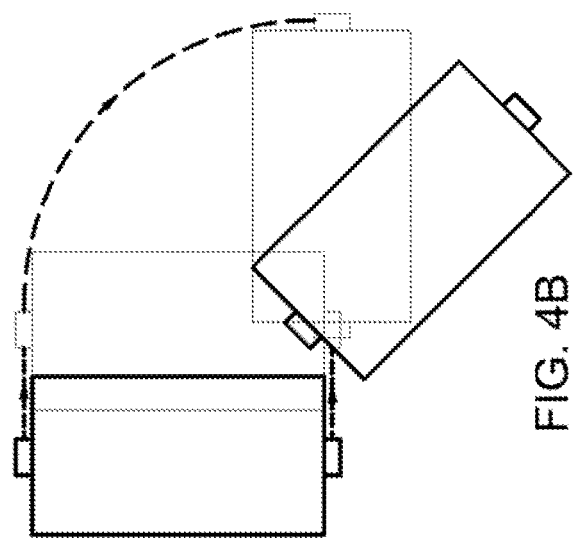
FIG. 4B depicts movement of tapping machine in a second testing cycle.
Figure 4C:
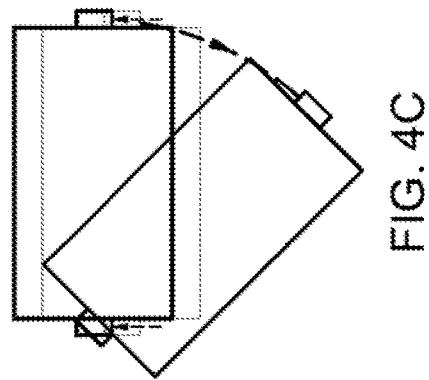
FIG. 4C depicts movement of tapping machine in a third testing cycle.
Figure 4A:
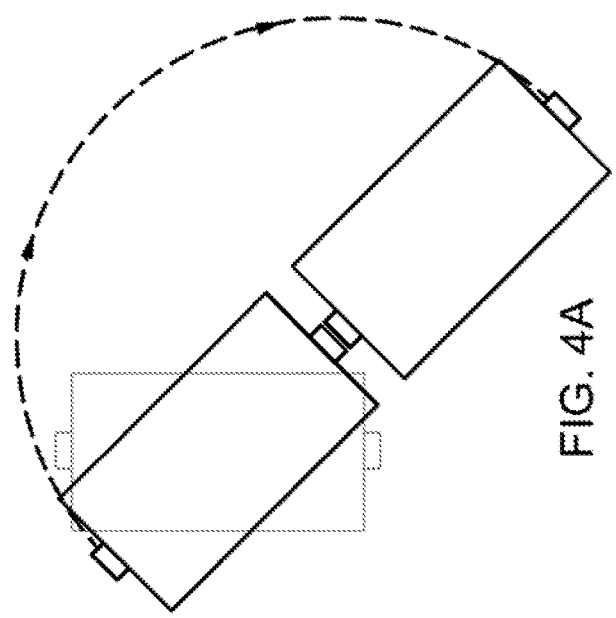
FIG. 4A depicts movement of tapping machine in a first testing cycle.

The second main program for operation of the machine is the one originally used to test the accuracy of the tapping machine over the course of several testing cycles. The program asks the user only for the number of cycles the tapping machine should move through, as shown in FIGS. 4a-c. The front panel of the VI shows a picture of the current position of the machine as well as the image captured by the webcam and the processed image used to calculate the degree of accuracy in the tapping machine's position.

Positional Accuracy with Image

In a preferred configuration image processing is the primary tool used in the measurement of the accuracy of the machine positions. A webcam is attached to the right rear corner of the frame, which picks up a video of the frame's position. The controller processes the picked up video. A marker can be placed on a paper testing mat at each position such that the marker would be in the center of the image captured by the webcam if the robot, was in fact in the correct position. The distance of the center of the marker from the center of the image would be recorded to show the change in accuracy with each change in position.

Vibration Padding for the Frame

Depending on the machine, one option is to line the aluminum frame with vibration isolators before placing the tapping machine on it.

Wheels

In a preferred configuration a holonomic robotic system, which is one in which the robot can instantaneously move in any direction, is used. This is achievable in this application through the use of omni-wheels. Differing motor speeds and directions can be applied to achieve a desired direction of motion in a system using omni-wheels.

Fiducial Markers

One option of the position control of the machine is to use a method called dead-reckoning to achieve its target positions. In this methodology, the machine would be given target encoder positions, and would change its position relative to its last position only.

Alternatively, fiducial markers convey information about the robot's position and orientation relative to its surroundings, instead of only relative to its previous positions. These markers often appear in the form of gridlines or crosshairs that the robot aligns itself with. The orientation of the angles of the markers are compared with a goal orientation and the robot corrects its angle until they match. Fiducial markers could be incorporated into the testing mat in order to improve spacial accuracy.

Mobile User Interface

Can be a computer with the software of an application or an app on a phone.

As will be evident to persons skilled in the art, the foregoing detailed description, applications and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed:

1. A robotic platform for moving a tapping machine, having a longitudinal axis and a middle hammer having an axis, for performing a tapping test in a lab or in the field in a floor area, having a midpoint, which includes or does not include joists, the joists including central joists, the robotic platform comprising:
   at least one sensor;
   a controller;
   a frame for receiving the tapping machine; and
   a motor attached to the frame for moving the frame with the tapping machine received thereon and connected to the controller;
   wherein the frame is configured to hold the tapping machine,
   wherein the motor is configured to receive commands from the controller, wherein the motor is further configured to move said frame and the tapping machine, wherein said commands include commands to move said frame and the tapping machine in a precise manner through the four tapping machine positions specified by one or more of American Society for Testing and Materials (ASTM) Test Methods E1007, E492, and standard tests for Impact Insulation Class (IIC), Apparent Impact Insulation Class (AIIC), and Field Impact Insulation Class (FIIC);
   wherein the tapping machine positions include:
      a first position wherein the middle hammer of the tapping machine is coincident with the midpoint of the floor area;
      a second position that is identical with said first position and the tapping machine is rotated 90° around the axis of the middle hammer;
      a third position displaced laterally with respect to said first position, wherein
         if the floor area includes joists, the longitudinal axis of the machine is centered midway between and parallel to the central joists and to said first position, and
         if the floor area does not include joists, the lateral displacement of the tapping machine is 0.6 m from said first position; and
      a fourth position wherein the longitudinal axis of the tapping machine forms an angle of 45° with said first position and the tapping machine is displaced laterally so that the middle hammer is 0.6 m from the midpoint of said first position.

2. The robotic platform of claim 1, wherein the frame includes omni wheels.

3. The robotic platform of claim 1, further comprising fiducial markers positioned on the frame and wherein the at least one sensor identifies a frame position in space based on a sensor signal reflecting a position of the fiducial markers.

4. The robotic platform of claim 1, wherein the at least one sensor comprises a webcam, camera or like image CCD pick-up device.

5. The robotic platform of claim 1, wherein the controller operates a software application that processes signals from the at least one sensor to determine positions the machine should move through the four positions required by the ASTM test methods.

6. The robotic platform of claim 1, further comprising vibration isolators formed of padding located between said frame and said tapping machine.

7. An automatic system for implementing ASTM test methods in a lab or in the field in a floor area, having a midpoint, which includes or does not include joists, the joists including central joists, comprising:
   a tapping machine having a longitudinal axis and a middle hammer having an axis,
   a robotic platform for the tapping machine, the robotic platform comprising:
   at least one sensor;
   a controller;
   a frame for receiving the tapping machine; and
   a motor attached to the frame for moving the frame with the tapping machine received thereon;
   wherein the frame is configured to hold the tapping machine, or other machine with a proportional-derivative control,
   wherein the motor is configured to receive commands from the controller, wherein the motor is further configured to move the frame and tapping machine, wherein said commands include commands to move said the frame and tapping machine in a precise manner through the four tapping machine positions specified by one or more of American Society for Testing and Materials (ASTM) Test Methods E1007, E492, and standard tests for Impact Insulation Class (IIC), Apparent Impact Insulation Class (AIIC), and Field Impact Insulation Class (FIIC)
   wherein the tapping machine positions include:
      a first position wherein the middle hammer of the tapping machine is coincident with the midpoint of the floor area;
      a second position that is identical with said first position and the tapping machine is rotated 90° around the axis of the middle hammer;
      a third position displaced laterally with respect to said first position, wherein
         if the floor area includes joists, the longitudinal axis of the machine is centered midway between and parallel to the central joists and to said first position, and
         if the floor area does not include joists, the lateral displacement of the tapping machine is 0.6 m from said first position; and
      a fourth position wherein the longitudinal axis of the tapping machine forms an angle of 45° with said first position and the tapping machine is displaced laterally so that the middle hammer is 0.6 m from the midpoint of said first position.

8. The system of claim 7, wherein the frame includes omni wheels.

9. The system of claim 7, further comprising fiducial markers positioned on the frame and wherein the at least one sensor identifies a frame position in space based on a sensor signal reflecting a position of the fiducial markers.

10. The system of claim 7, wherein the at least one sensor comprises a webcam, camera or like image CCD pick-up device.

11. The system of claim 7, wherein the controller operates a software application that processes signals from the at least one sensor to determine positions the machine should move through the four positions required by the ASTM test methods.

12. The system of claim 7, further comprising vibration isolators formed of padding located between said frame and said tapping machine.

\* \* \* \* \*